United States Patent [19]
Kudo

[11] Patent Number: 5,497,986
[45] Date of Patent: Mar. 12, 1996

[54] AUTOMATIC DOCUMENT FEEDER

[75] Inventor: Taku Kudo, Sagamihara, Japan

[73] Assignee: Ricoh Company, Ltd., Tokyo, Japan

[21] Appl. No.: 364,992

[22] Filed: Dec. 28, 1994

[30] Foreign Application Priority Data

Dec. 28, 1993 [JP] Japan ................................. 5-338070

[51] Int. Cl.$^6$ ...................................................... B65H 3/52
[52] U.S. Cl. ........................... 271/122; 271/245; 271/110
[58] Field of Search ............................... 271/3.62, 10.12, 271/10.13, 110, 117, 122, 227, 245, 246

[56] References Cited

U.S. PATENT DOCUMENTS

| | | | |
|---|---|---|---|
| 4,957,285 | 9/1990 | Yamada | 271/3.02 |
| 5,090,675 | 2/1992 | Nagai et al. | 271/10.12 |
| 5,169,136 | 12/1992 | Yamagata et al. | 271/10.13 |
| 5,351,945 | 10/1994 | Asakawa et al. | 271/122 |
| 5,411,247 | 5/1995 | Ohsawa | 271/245 |

FOREIGN PATENT DOCUMENTS

| | | |
|---|---|---|
| 63-123740 | 5/1988 | Japan . |
| 3-166128 | 7/1991 | Japan . |

*Primary Examiner*—H. Grant Skaggs
*Attorney, Agent, or Firm*—Oblon, Spivak, McClelland, Maier & Neustadt

[57] ABSTRACT

In an automatic document feeder (ADF), a feed roller is rotatable in an intended direction of document feed in contact with documents stacked on a document table. A reverse roller is rotatable in the direction opposite to the intended direction of document feed in contact with the documents. A a one-way clutch is mounted on a drive shaft, which drives the reverse roller, such that the clutch uncouples when the reverse roller rotates in the direction opposite to the intended direction of document feed or couples when it rotates in the intended direction of document feed. A shutter is rotatably mounted on the body of the ADF and has a stop for causing the documents stacked on the table to abut thereagainst. When the reverse roller rotates in the direction opposite to the intended direction of document feed, the shutter, received power from the clutch, moves in a direction for closing a document inlet, causing the stop to protrude to above the table at a predetermined position. The ADF frees a drive motor from an extra load for driving the shutter during document feed and prevents, for example, a torque limiter from constantly sliding during document feed.

2 Claims, 11 Drawing Sheets

AUTOMATIC DOCUMENT FEEDER

BACKGROUND OF THE INVENTION

The present invention relates to an automatic document feeder (ADF) for a facsimile apparatus, printer or similar image forming apparatus and capable of feeding a stack of documents one by one while separating them from each other.

An ADF extensively used today has a document table to be loaded with a stack of documents. A feed roller and a roller contacting it cooperate to feed one document at a time while separating it from the others. One of major problems with the ADF is that the document separating ability greatly depends on how the operator sets documents on the document table. For example, when documents are inserted into the ADF as far as their leading edges reach the gap between the two cooperative rollers, it is likely that two or more of them are fed at the same time.

Some different approaches have been proposed to eliminate the above problem. For example, Japanese Patent Laid-Open Publication Nos. 63-123740 and 3-166128 teach a stop which aligns the leading edges of documents at a predetermined position by causing them to abut against it. This successfully prevents the leading edges of document from reaching the gap between the feed roller and the roller contacting it. In addition, such an approach obviates the simultaneous feed of two or more documents by aligning the leading edges of documents.

However, in the above Laid-Open Publication No. 3-166128, a shutter torque limiter continuously slides during the course of document feed in order to generate a torque for raising the stop. This forces a motor to bear an extra load corresponding to the torque being generated by the shutter torque limiter. Hence, an expensive high-output motor is needed. Further, the torque limiter brings about a durability problem since it constantly slides.

SUMMARY OF THE INVENTION

It is, therefore, an object of the present invention to provide an inexpensive and durable ADF.

An ADF of the present invention has a feed roller is rotatable in an intended direction of document feed in contact with documents stacked on a document table. A reverse roller is rotatable in the direction opposite to the intended direction of document feed in contact with the documents. A a one-way clutch is mounted on a drive shaft, which drives the reverse roller, such that the clutch uncouples when the reverse roller rotates in the direction opposite to the intended direction of document feed or couples when it rotates in the intended direction of document feed. A shutter is rotatably mounted on the body of the ADF and has a stop for causing the documents stacked on the table to abut thereagainst. When the reverse roller rotates in the direction opposite to the intended direction of document feed, the shutter, received power from the clutch, moves in a direction for closing a document inlet, causing the stop to protrude to above the table at a predetermined position.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
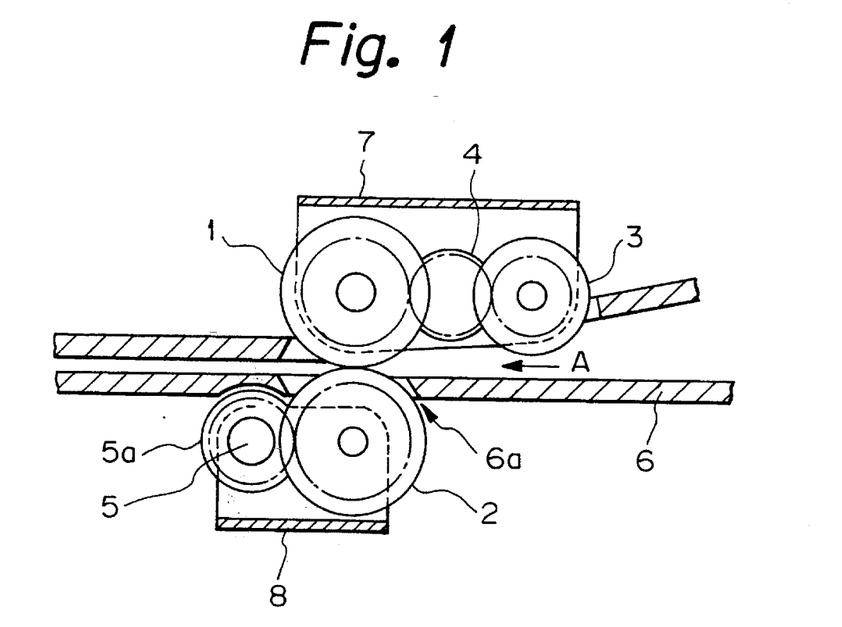
FIG. 1 is a side elevation of rollers and gears included in an ADF embodying the present invention.

Referring to FIG. 1 of the drawings, essential part of an ADF embodying the present invention is shown. As shown, the ADF has a feed roller 1, a reverse roller 2, a pick-up roller 3, an idle gear 4, a drive shaft 5, a document table 6, a pick-up bracket 7, and a reverse roller bracket 8. The feed roller 1, idle gear 4 and pick-up roller 3 are supported by the pick-up bracket 7 and held in mesh with each other. The bracket 7 is disposed above the document table 6. The reverse roller bracket 8 is located below the table 6 and supports the reverse roller 2 and a drive gear 5a affixed to the drive shaft 5 and meshing with the reverse roller 3. The reverse roller 2 protrudes to above the surface of the table 6 through an opening 6a formed in the table 6. The reverse roller 2 is held in contact with the feed roller 1. The feed roller 1 is rotated by a motor which will be described. The feed roller 1, in turn, rotates the pick-up roller 3 in the same direction via the idle gear 4. To feed a document, the rotation of the motor is transmitted to the reverse roller 2 via the drive gear 5a, causing it to rotate in the same direction as the feed roller 1. As a result, one of documents stacked on the table 6 is driven by the pick-up roller 3 in a direction A and then fed out via a nip portion between the feed roller 1 and the reverse roller 2 while being separated from the other documents.

Figure 2:
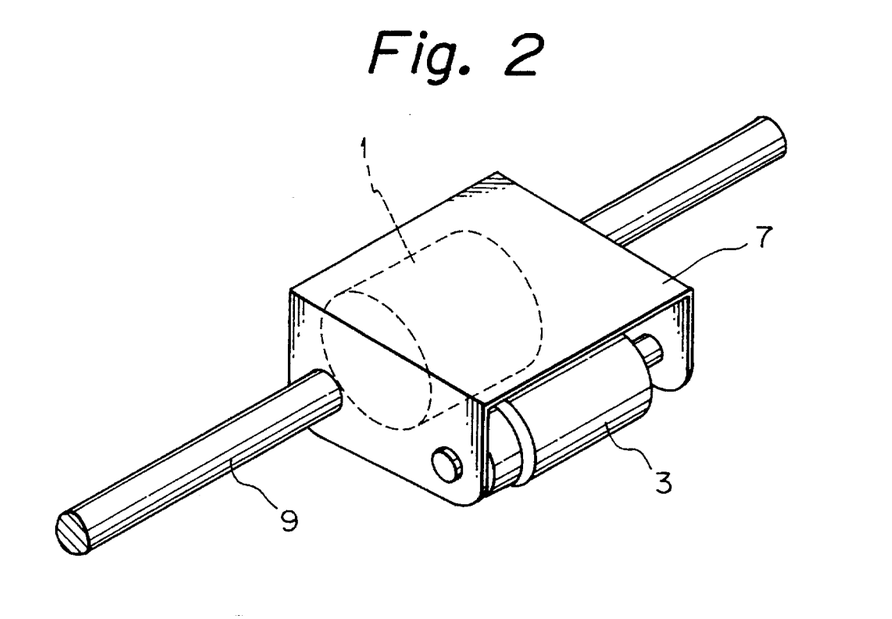
FIG. 2 is a perspective view of an arrangement around a feed roller included in the embodiment.
Figure 3:
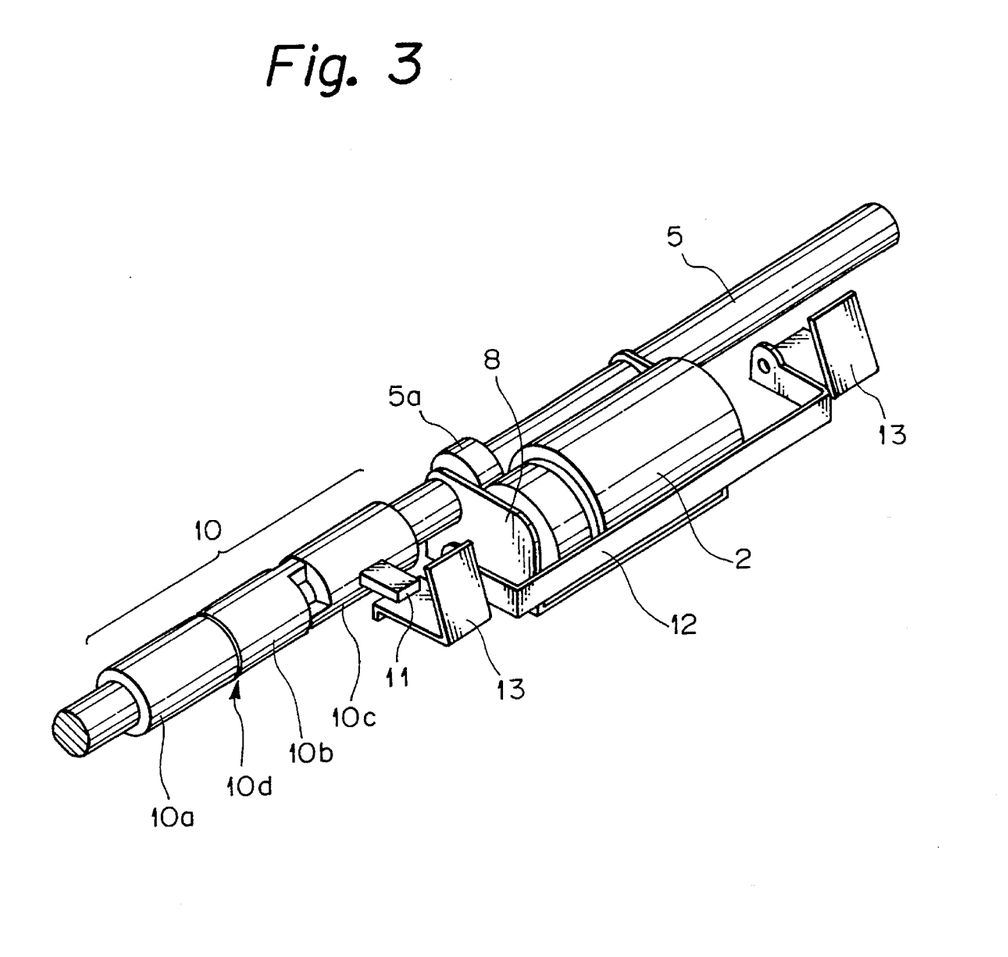
FIG. 3 is a perspective view of an arrangement around a reverse roller also included in the embodiment.
Figure 4:
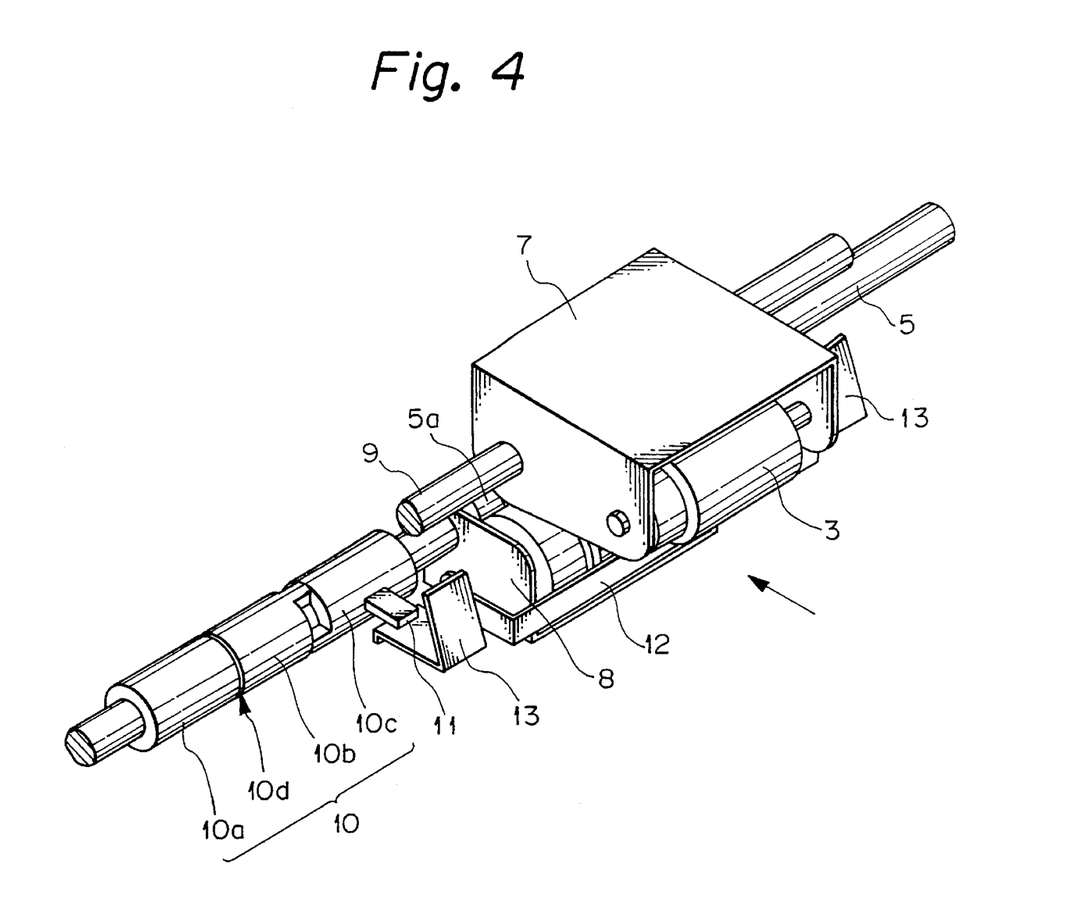
FIG. 4 is a perspective view of the ADF.

FIGS. 2 and 3 respectively show an arrangement around the feed roller 1 and an arrangement around the reverse roller 2. FIG. 4 shows the ADF in a perspective view. As shown in FIG. 2, the pick-up roller 3 and a feed roller drive shaft 9 are mounted on the pick-up bracket 7 which is generally U-shaped. As shown in FIG. 3, a one-way clutch 10 has a power input member 10a, a power transfer member 10b, a power output member 10c, and a ratchet portion 10d. A lever 11 extends out from the power output member 10c. A generally U-shaped shutter 12 is provided with generally V-shaped stops 13 at opposite ends thereof. The stops 13 are located at opposite sides of the pick-up bracket 7. The reverse roller bracket 8 and the power output member 10c, power transfer member 10b and power input member 10a of the one-way clutch are sequentially mounted on the drive shaft 5 in this order. The lever 11 of the power output member 10c is engageable with only one of the stops 13. The shutter 12 is journalled to the ADF body.

Figure 5:
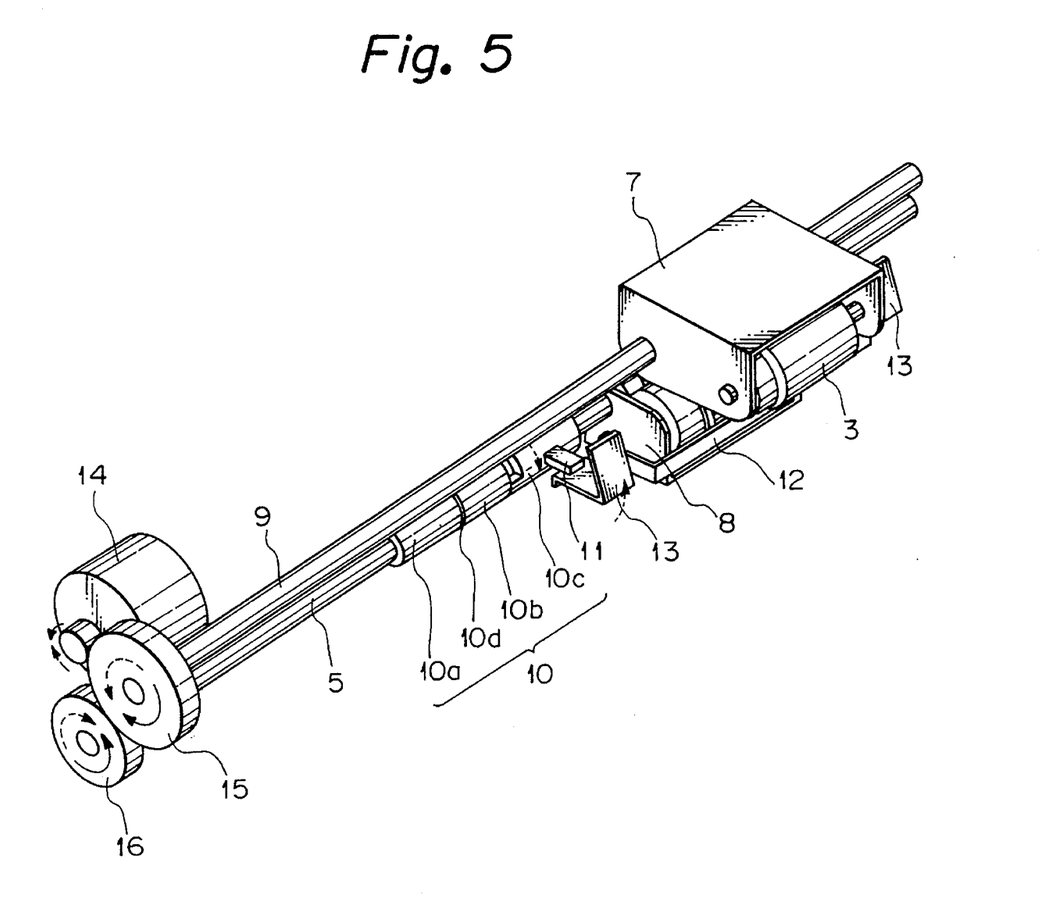
FIG. 5 is a perspective view of a drive system also included in the embodiment.

FIG. 5 shows a drive mechanism included in the ADF. As shown, the mechanism includes a motor 14, a feed gear 15 mounted on one end of the feed roller shaft 9, and a reverse gear 16 mounted on one end of the drive shaft 5. The output shaft of the motor 14 is held in mesh with the feed gear 15 which is, in turn, held in mesh with the reverse gear 16. Hence, when the motor 14 rotates, the reverse gear 16 is rotated by and in opposite direction to the feed gear 15. The feed roller 1, FIG. 1, is directly rotated by the feed roller shaft 9 while the reverse roller 2 is rotated by way of the drive gear 5a. As a result, the feed roller 1 and reverse roller 2 are rotated in the same direction as each other.

Figure 6A:
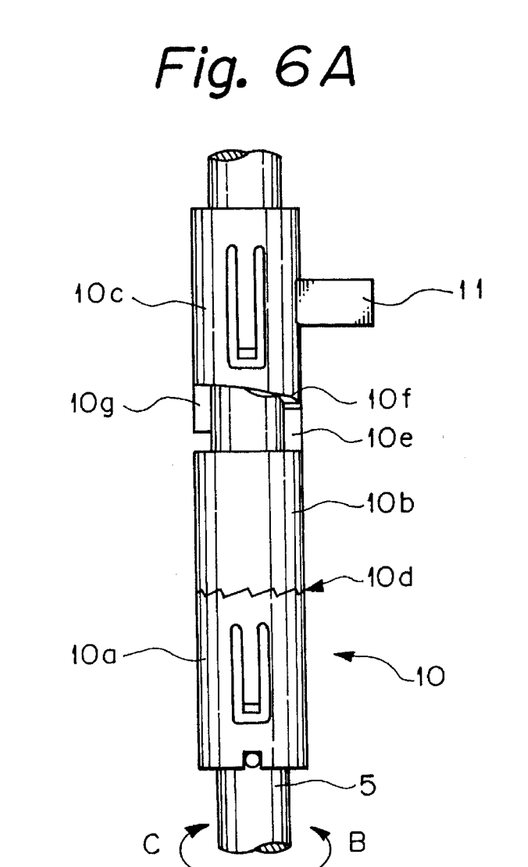
FIGS. 6A and 6B are plan views showing a one-way clutch also included in the embodiment.
Figure 6B:
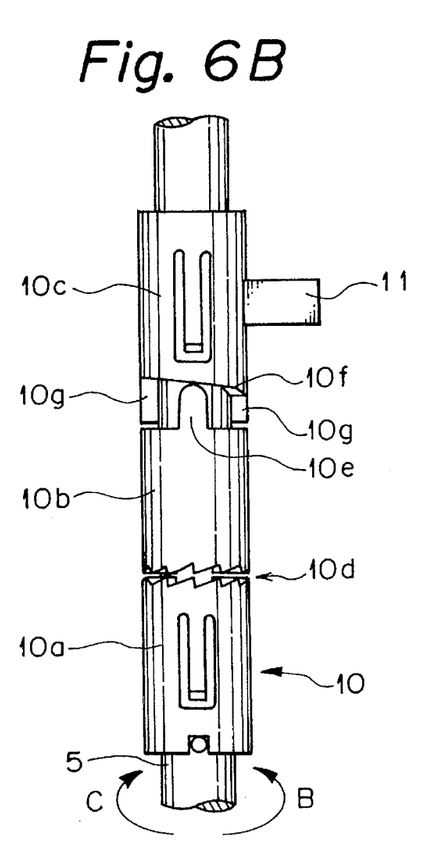

As shown in FIGS. 6A and 6B, in the one-way clutch 10, a lug 10e extends from the end of the power transfer member 10b which faces the power output member 10c. The end of the power output member 10c which faces the power transfer member 10b is formed with a slide surface 10f which is inclined from the fight to the left, as viewed in FIGS. 6A and 6B. The tip of the lug 10e abuts against the slide surface 10f. The power output member 10c has a locking portion 10g at opposite sides of the slide surface 10f. The power input member 10a is affixed to the drive shaft 5 while the power transfer member 10b is mounted on the shaft 5 to be movable in the axial direction and circumferential direction of the shaft 5. The power output member 10c is movable only in the circumferential direction of the shaft 5. The ratchet portion 10d is implemented by teeth formed in the facing ends of the power input member 10a and power transfer member 10b and capable of meshing with each other. The teeth of the ratchet portion 10d are raised to the right, as viewed in the figures.

When the drive shaft is rotated in a direction B shown in FIGS. 6A and 6B, the teeth of the ratchet portion 10d are brought into mesh to rotate the power transfer portion 10b. As a result, the lug 10e abuts against the locking portion 10g, thereby causing the power output shaft 10c to rotate in the direction B. When the drive shaft 5 is rotated in a direction C opposite to the direction B, the teeth of the ratchet portion 10d are released with the result that the power transfer member 10b moves in the axial direction with the lug 10e sliding on the slide surface 10f. Hence, the rotation of the drive shaft 5 is not transferred to the power output member 10c, i.e., only the drive shaft 5 rotates.

When no documents are stacked on the table 6, the pick-up roller 3 is spaced apart from the table 6 by a solenoid or similar actuator. When documents are stacked on the table 6, a sensor or similar sensing means senses them. Then, the pick-up roller 3 is angularly moved downward about the axis of the feed roller I to the position shown in FIG. 4. In this position, the pick-up roller 3 drives the uppermost document toward the feed roller 1.

Figure 7:
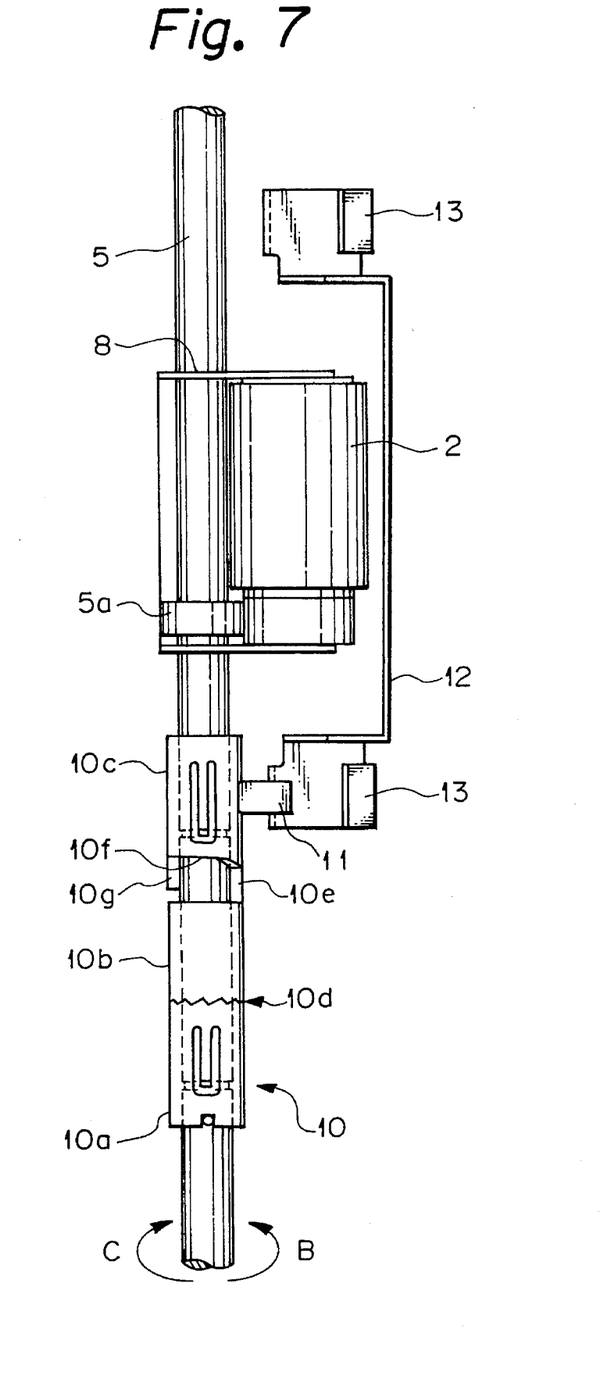
FIG. 7 is a plan view showing the one-way clutch in a coupled condition.
Figure 8:
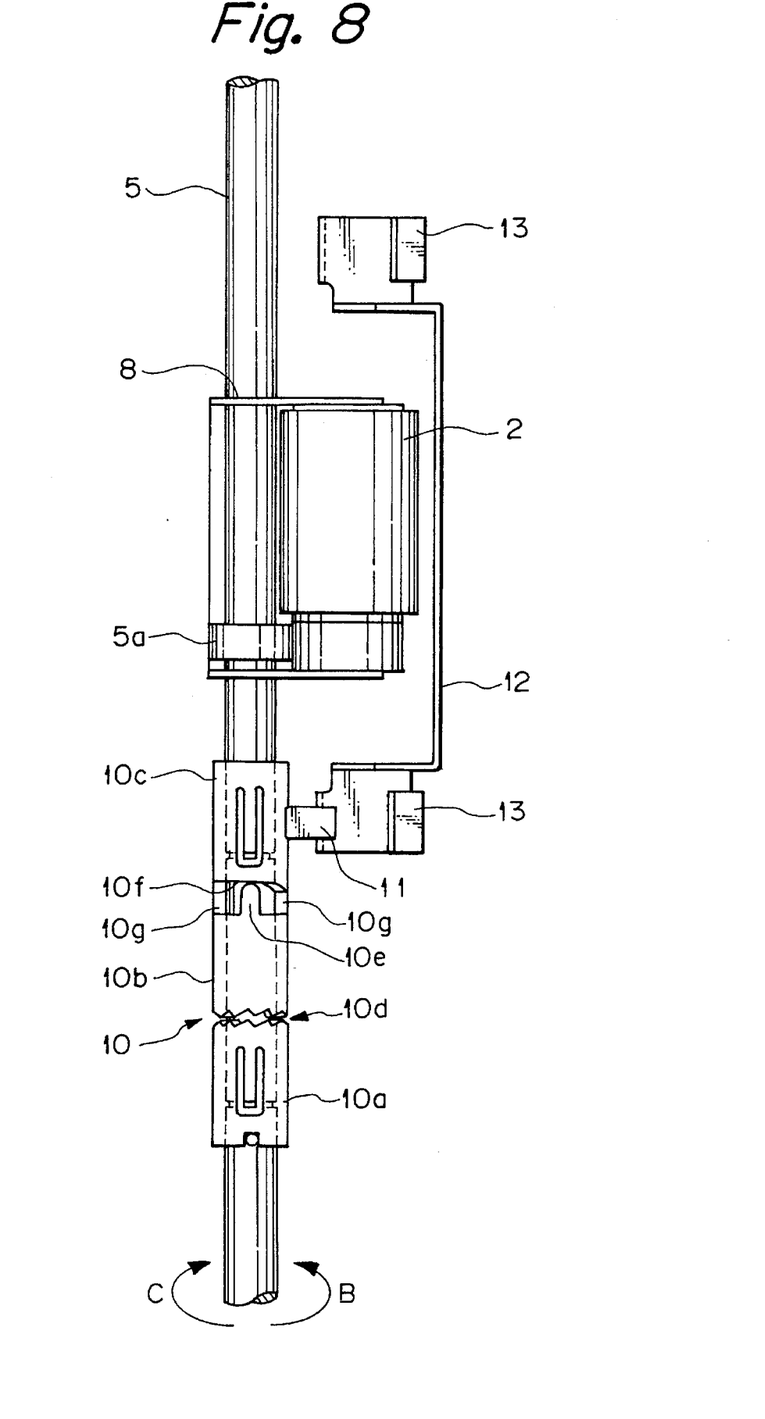
FIG. 8 is a plan view showing the one-way clutch in an uncoupled condition.

FIGS. 7 and 8 respectively show a condition wherein the ratchet portion 10d is coupled and a condition wherein it is uncoupled. As shown in FIG. 8, when the drive shaft 5 is rotated in the direction C, the ratchet portion 10d is released to cause the reverse roller 2 to rotate in the direction opposite to the document feed direction via the drive gear 5a. As shown in FIG. 7, when the drive shaft 5 is rotated in the direction B, the ratchet portion 10d is coupled to transfer the rotation of the drive shaft 5 to the power output member 10c. At this instant, the lever 11 presses one end of the stop 13 to rotate the shutter 12, while causing the other end of the stop 13 to rise.

Figure 9A:
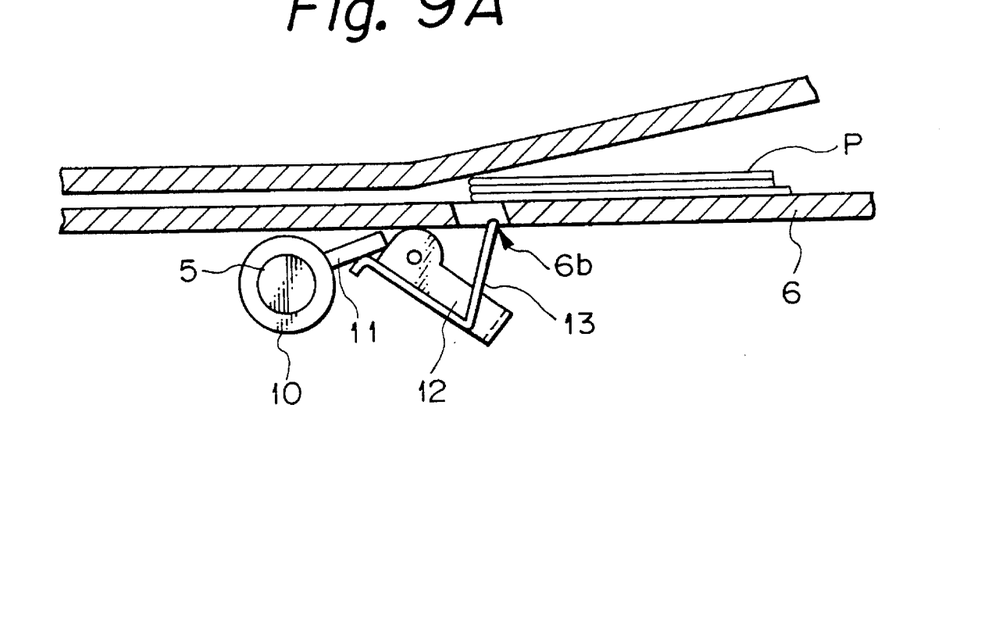
FIGS. 9A and 9B are fragmentary side elevations showing the operating of a lever also included in the embodiment.
Figure 9B:
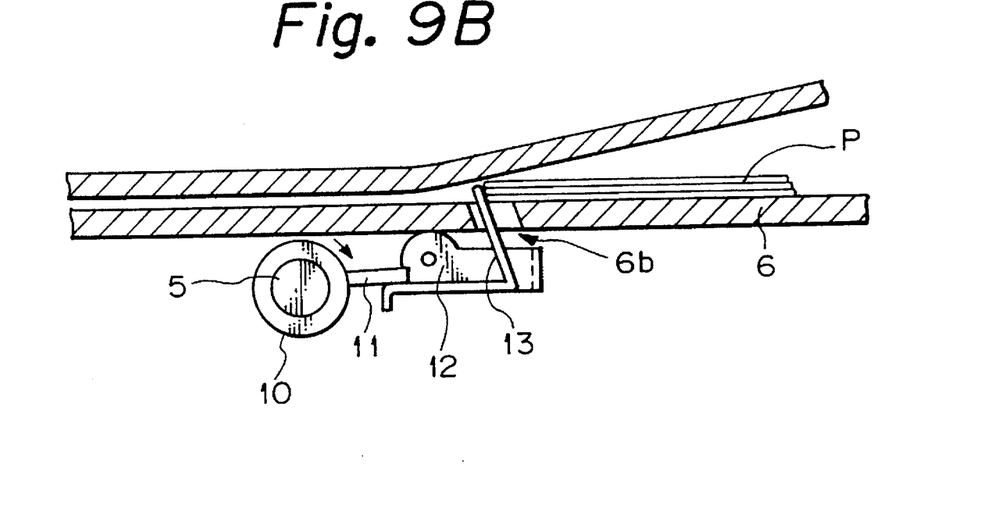

The operation of the lever 11 will be described with reference to FIGS. 9A and 9B. As shown, the table 6 is formed with a hole 6b facing the end of the stop 13 which is remote from the lever 11. While documents P are sequentially fed, the stop 13 is lowered to a position shown in FIG. 9A due to the weight of the shutter 12 or by a spring or similar biasing means since the rotation of the drive shaft 5 is not transmitted to the power output member 10c. In this condition, the end of the stop 13 remote from the lever 11 is disposed below the hole 6b of the table 6. While documents P are not fed, the drive shaft 5 is reversed by a predetermined amount with respect to the direction of rotation during document feed. As a result, the shutter 12 is raised until the end of the stop 13 protrudes to above the surface of the table 6 via the hole 6b, as shown in FIG. 9B. In this position, the stop 13 aligns the leading edges of the documents P. Since the end of the stop 13 protruding from the table 6 is inclined in the document feed direction, the aligned edges of the documents P sequentially protrude in the document feed direction from the top to the bottom. It is to be noted that the other stop 13 of the shutter 12 operates in the same manner as the above-stated stop 13.

Figure 10:
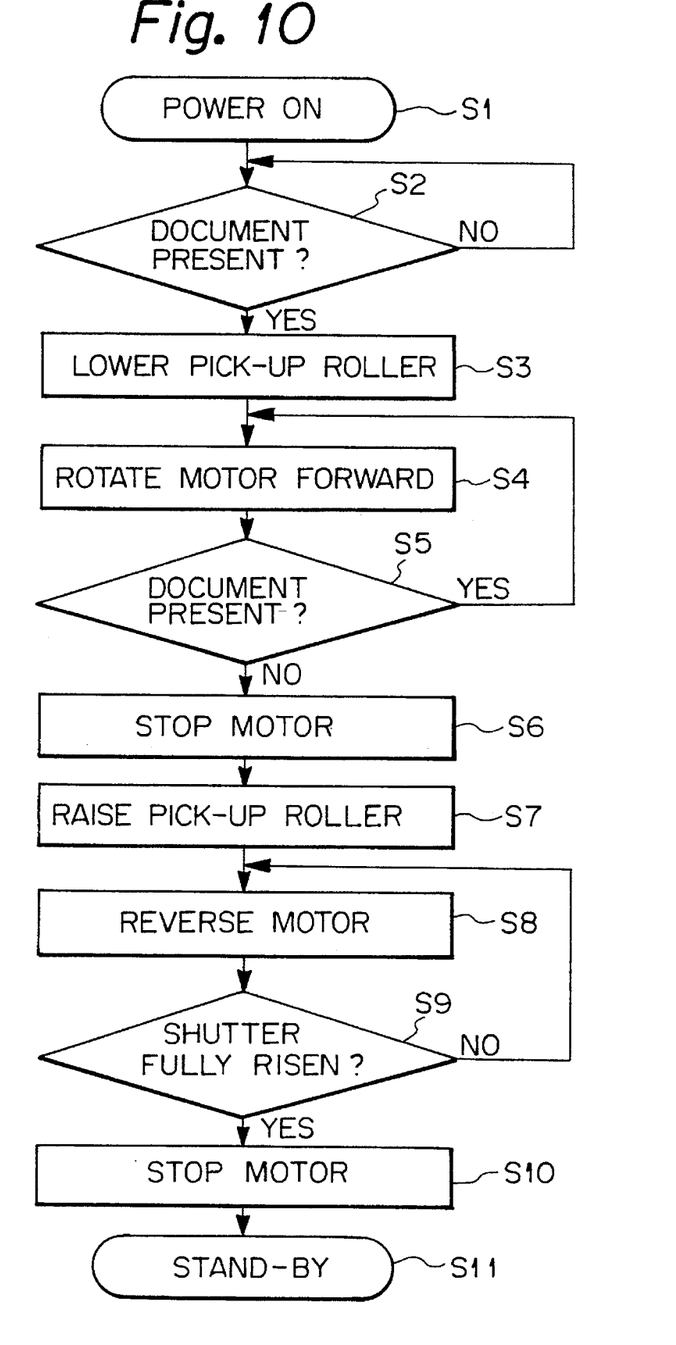
FIG. 10 is a flowchart demonstrating the operation of the embodiment.

A reference will be made to FIG. 10 for describing a sequence of document feeding steps particular to the embodiment. First, when a power source is turned on (step S1), whether or not documents are present on the table 6 is determined (step S2). This decision is done on the basis of the output of a sensor, not shown, built in the ADF. When the output of the sensor is absent (NO, step S2), the step S2 is repeated. When the output of the sensor is present (YES, step S2), the pick-up roller 3 is lowered (step S3) while the motor 14 is driven forward (step S4). As a result, the pick-up roller 3 starts driving the uppermost document. The document feeding operation is repeated (YES, step S5) until all the documents on the table 6 have been fed out (NO, step S5). Then, the output of the sensor disappears. In response, the motor 14 is deenergized (step S6) with the result that the pick-up roller 3 is raised (step S7). Subsequently, the motor 14 is reversed (step S8) to raise the shutter 12 (step S9). The reverse rotation of the motor 14 continues until the stop 13 protrudes from the table 6 via the hole 6a (NO, step S9). After the stop 13 has protruded from the table 6 (YES, step S9), the motor 14 is deenergized (step S10). In this condition, the ADF awaits another set of document.

Figure 11:
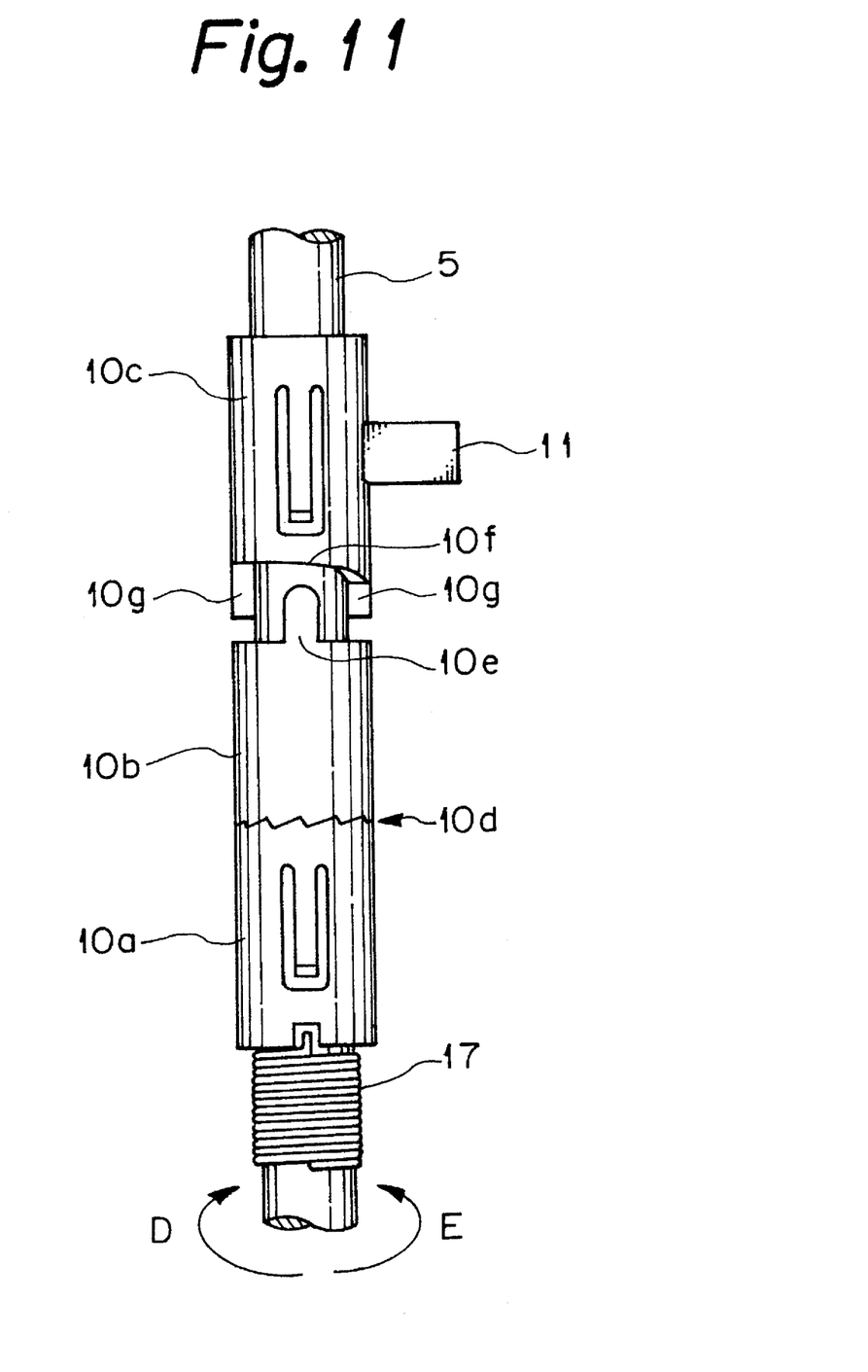
FIG. 11 is a fragmentary plan view of an alternative embodiment of the present invention.

Referring to FIG. 11, an alternative embodiment of the present invention is shown in a fragmentary view. As shown, the ADF has a torque limiter 17 implemented by a spring. In this embodiment, the power input section 10a of the one-way clutch 10 is movable only in the circumferential direction of the drive shaft 5. The torque limiter or spring 17 is anchored at one end to the drive shaft 5 and at the other end to the power input section 10a. The torque limiter 17 is wound round the drive shaft 5 such that the spring tightens when the one-way clutch 10 is rotated in the opposite direction (D in the figure) to the rotation transfer direction.

When the one-way clutch 10 is rotated in the rotation transfer direction (E in the figure), a predetermined torque is transferred from the drive shaft 6 to the clutch 10. As a result, the lever 11 causes the shutter 12 to rise. In this case, the force holding the shutter 12 in the raised position is based on the torque to be generated by the torque limiter 17. Hence, if some means is provided for pressing the stop 13 from above the table 6 with a force overcoming the torque of the torque limiter 17, the stop 13 will be lowered to below the table 6. The torque of the torque limiter 17 maintains the shutter 12 in abutment against the table 6. When the clutch 10 is rotated in the direction D, the torque limiter or spring 17 tightens. As a result, a torque greater than the above-mentioned predetermined torque is transmitted from the drive shaft 5 to the clutch 10. However, the torque is not transferred to the power output member 10c since it is not transferred from the power input member 10a to the power transfer member 10b.

Figure 12:
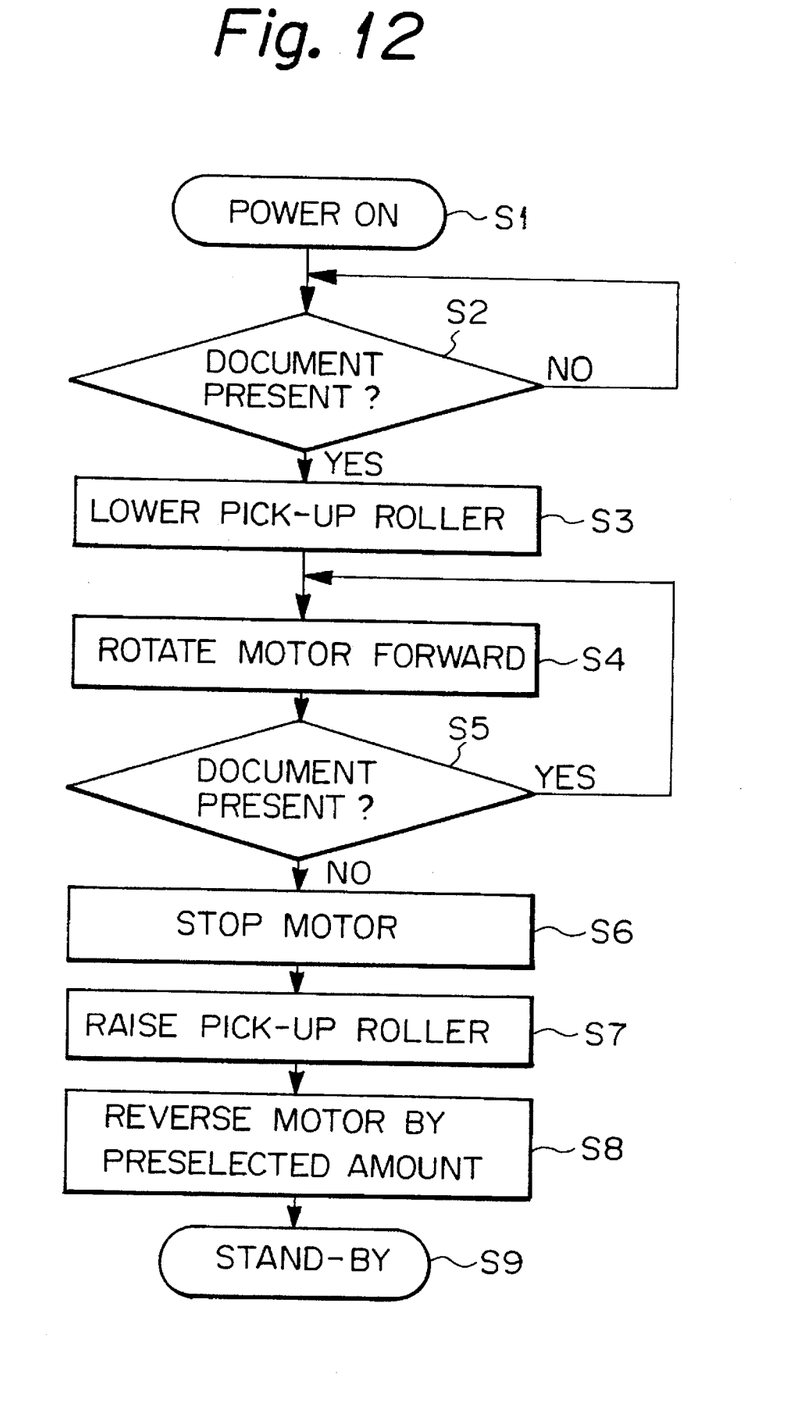
FIG. 12 is a flowchart demonstrating the operation of the alternative embodiment.

A reference will be made to FIG. 12 for describing a sequence of document feeding steps particular to the alternative embodiment. In the routine of FIG. 12, steps S1–S7 are identical with the steps S1–S7 shown in FIG. 10. As shown, after the pick-up roller 3 has been raised (step S7), the motor 14 is reversed by a predetermined amount (step S8). As a result, the stop 13 protrudes from the table 6 and remains in this position due to the action of the torque limiter 17. In this condition, the ADF awaits for another set of documents.

As stated above, in the embodiments shown and described, when the drive shaft 5 is rotated forward to rotate the reverse roller 2 in the opposite direction to the document feed direction, only the drive shaft 5 is rotated due to the one-way clutch 10 mounted on the shaft 5. When the drive shaft 5 is reversed to raise the shutter 12, the lever 11 is also rotated to press the stop 13 of the shutter 12. This successfully frees the motor from an extra load otherwise required to drive the shutter during document feed. This, coupled with the fact that the torque limiter 17, for example, does not constantly slide during document feed, realizes an inexpensive and durable arrangement. Particularly, the alternative embodiment described eliminates the need for sensing means for determining whether or not the shutter 12 has been fully raised during the reverse rotation of the motor 14, thereby simplifying control over the drive system. In the event of maintenance, e.g., to remove a jamming document, the stop 13 can be readily lowered to below the table 6 only if the shutter 12 is pressed by a predetermined force.

In summary, it will be seen that the present invention provides an inexpensive and durable ADF which frees a drive motor from an extra load for driving a shutter during document feed and prevents, for example, a torque limiter from constantly sliding during document feed. Further, the ADF does not need sensing means for for determining whether or not the shutter has been fully raised during the reverse rotation of the motor, thereby simplifying control over the drive system. In addition, the shutter can be retracted from a document table so as to facilitate maintenance.

Various modifications will become possible for those skilled in the art after receiving the teachings of the present disclosure without departing from the scope thereof.

What is claimed is:

1. An ADF comprising:

a feed roller rotatable in an intended direction of document feed in contact with documents stacked on a document table;

a reverse roller rotatable in a direction opposite to the intended direction of document feed in contact with the documents;

a one-way clutch mounted on a drive shaft, which drives said reverse roller, such that said one-way clutch uncouples when said reverse roller rotates in the direction opposite to the intended direction of document feed or couples when said reverse roller rotates in said intended direction of document feed; and a shutter rotatably mounted on a body of said ADF and comprising a stop for causing the documents stacked on said document table to abut thereagainst;

wherein when said reverse roller rotates in the direction opposite to the intended direction of document feed, said shutter, receiving power from said one-way clutch, moves in a direction for closing a document inlet, causing said stop to protrude to above said document table at a predetermined position.

2. An ADF as claimed in claim 1, further comprising a torque limiter arranged between a power input side of said one-way clutch and said drive shaft in order to limit, when said one-way clutch rotates in a direction for transferring the power, a transfer of a torque greater than a predetermined torque to said shutter.

\* \* \* \* \*